United States Patent Office 3,461,084
Patented Aug. 12, 1969

3,461,084
CUPRIC CHLORIDE-ALUMINA CATALYST
Tao Ping Li, Texas City, Tex., assignor to Monsanto Company, St. Louis, Mo., a corporation of Delaware
No Drawing. Filed Nov. 10, 1965, Ser. No. 507,222
Int. Cl. B01j 11/78; C07b 9/00; C01b 7/04
U.S. Cl. 252—441                                 1 Claim

ABSTRACT OF THE DISCLOSURE

An improved method for preparing catalysts containing a cupric salt such as cupric chloride as the active catalytic agent in combination with activated alumina which comprises dry mixing the anhydrous cupric salt and activated alumina and heating the mixture at a temperature of at least 350° C. for a period of at least 3 hours.

---

The present invention relates to the preparation of copper salt catalysts useful in the oxidation of hydrogen chloride and in the oxidative chlorination of hydrocarbons. More particularly, it concerns an improved method of preparing cupric halide catalysts and the utilization of the catalysts so prepared in an oxidative chlorination process.

Chlorination of hydrocarbon gases with hydrogen chloride and air or oxygen is a well known process. Suitable catalysts are customarily used to accelerate the reaction. The catalysts usually employed comprise the salts, particularly, the halides, of metals having variable valences. These salts have been used as such, in combination with various promoting substances, and in combination with or disposed upon mineral substances such as asbestos, diatomaceous earth, pumice, clay, kieselguhr, alumina, silica, and the like. A particularly effective catalyst comprises a copper halide which is in combination with or disposed upon activated alumina, or a catalyst composition containing the copper halide as the active catalytic agent impregnated on activated alumina. The process has generally been carried out by passing a mixture of hydrogen chloride, oxygen or air, and the hydrocarbon through a reaction chamber containing a stationary or fixed bed of the catalyst. More recently, however, the catalyst has come to be employed in a finely divided state according to the so-called fluidized catalyst technique. One of the main disadvantages of the copper halide catalysts is that they are volatile at the required reaction temperatures. Thus, the catalyst mass is unable to retain its activity over an extended period of time because of loss of the copper halide and it must be continually replaced or recovered and returned to the reaction zone. The problem of catalyst losses is aggravated when the catalyst is employed in the fluidized state. Because of the larger surface resulting from the subdivision of the catalyst particles, loss of the copper halide is even more pronounced and catalyst life is even shorter.

Another disadvantage of the catalysts of the prior art lies in sensitivity of the catalysts to iron contamination. The catalysts are generally employed in ferrous equipment, and in normal operation, iron-containing corrosion products which are introduced through feed gas lines or produced in the reactor itself are picked up by the catalysts resulting in a loss of activity with consequent lowering of yields and a significant increase in attrition rate. Occasionally, periods of abnormal operation or upset conditions aggravate this problem.

The common technique for incorporating the copper halide on the active carrier comprises impregnating the carrier in the form of granules, pellets or finely divided particles with an aqueous solution of the copper halide and then drying the mixture at the desired temperature. A much improved catalyst can be produced if the carrier is impregnated with a solution of the copper halide in an alcohol and thereafter dried as disclosed and claimed in U.S. Patent 3,010,913. With this catalyst, corrosion problems in the reactor are alleviated in comparison with those encountered with catalysts prepared by the more usual methods. However, this catalyst still suffers from the disadvantages described above, particularly, when upsets in operating conditions occur.

It has now been discovered that a highly superior catalyst for oxidative chlorination processes can be prepared which is characterized by high activity, sustained stability attributable to its excellent resistance to contamination by iron, and significantly lower attrition losses than those already known to the art. In addition, in its preferred embodiment the newly discovered method of preparation is essentially simpler than those currently practiced since no solvent is required.

According to the invention, improved catalytic compositions containing a cupric halide as the active constituent in combination with or supported upon a carrier such as activated alumina are obtained by heat-treating the combination of the cupric halide and activated alumina at a temperature of at least 350° C. and preferably at temperatures in the range from about 400° to about 800° C. for a period of at least three hours. The combination of cupric halide and the activated alumina support may be obtained in any manner. The cupric halide may be applied to the alumina support by impregnating the latter with a solution, aqueous or otherwise, for example, an alcoholic solution as described in the aforementioned patent, of the cupric halide, separating the solids from the liquid, and drying said solids. Alternatively, and in the preferred embodiment of the invention, finely divided anhydrous cupric chloride and activated alumina may be mixed dry at any temperature from room temperature to the temperature of the heat-treating step by any means and the mixture may then be subjected to the heat treatment. This makes it convenient to prepare the catalyst in the reactor in which it is to be employed or separately in simple mixing equipment, if desired.

As disclosed above, the minimum temperature at which the catalyst mixture is heat treated is 350° C. The length of time for which the catalyst is treated varies depending upon the temperature at which the treatment is effected. At the higher temperatures, less time is required than at the lower ones. The minimum treating time at the minimum temperature is at least three hours. For optimum results, the catalyst mixture is heated at temperatures in the range from about 400° C. to about 800° C. for from about four hours to about eight hours.

While not wishing to be bound by any theory as to exact mechanism of the formation of the improved catalyst of the invention, it appears that the superiority of the catalyst results from deposition of monomeric cupric halide molecules on the alumina surface in the form of —O—CuX (X being halogen) bonds. It is known that the surface of alumina is covered with different amounts of hydroxyl groups depending on the conditions of its preparation and calcination. These hydroxyl groups are bonded to the surface aluminum atoms. Reaction of such hydroxyl groups with the monomeric form of a cupric halide, eliminating hydrogen halide, forms the species —O—CuX which can associate with the $Cl^-$ ion and catalyze the reaction.

In the light of this projected mechanism for the reaction occurring in the catalyst preparation, the hydroxyl content of the alumina is an important factor when the dry-mix method of preparation is employed. Hydroxyl content is measured by determining percent loss on ignition (LOI) at 1000° C. The minimum LOI to insure a sufficient number of hydroxyl groups on the alumina surface for reaction with the cupric halide to form the active catalytic species is about 3%. A LOI value in excess of 8% indicates the presence of free adsorbed water on the surface of the alumina which can cause hydration of the cupric halide and, consequently, retard or inhibit contact between the cupric halide and the hydroxyl groups on the surface of the alumina interfering with the formation of the active catalytic species. Thus, the alumina employed in the dry-mixing step should have a LOI between about 3% and about 8% but preferably the alumina used for the catalyst support will have a LOI from about 5 to about 7%.

Alumina having a LOI less than the minimum specified can be hydrated by well known techniques such as merely exposing to humid atmosphere, steaming, etc., whereas that having a LOI in excess of the maximum can be readily dehydrated. Dehydration is easily effected by heating the alumina at temperatures from about 200° to about 600° C. for from two to about six hours. Generally, heating of alumina containing free adsorbed water at temperatures from 350 to 450° C. for about four hours produces a satisfactory support material.

The invention is illustrated in the following examples which, however, are not to be construed as limiting it in any manner whatsoever.

Example 1

About 1,000 g. of a cupric chloride-on-alumina catalyst containing 5% copper was prepared in the manner described in U.S. Patent 3,010,913. The catalyst was charged to a jacketed air-cooled glass reactor about 4 ft. long with an internal diameter 2.52 in. which was heated by means of a wire wrapping on the outside of the jacket. Ethylene was converted to 1,2-dichloroethane by oxidative chlorination over this catalyst by feeding hydrogen chloride, ethylene and air in a molecular ratio of 1.8:1:2.5 through the catalyst bed at velocities of 0.0821, 0.0455 and 0.1085 cubic feet/minute, respectively, to maintain the catalyst in a fluidized condition. The temperature of the reactor was maintained at about 250° C. while the pressure was substantially atmospheric. Contact time between reactants and catalyst in the fluidized system was approximately 3.75 seconds.

Dichloroethane and unreacted HCl were recovered from the effluent gaseous product by cooling it and passing it through a series of water scrubbers. Product conversion was calculated on the basis of HCl fed and HCl remaining in the reactor off-gas as determined by titration of the aqueous phase from the water scrubbers with standard caustic solution. Conversion of HCl at the end of the reaction period of about 5.4 hours was about 93%. Catalyst fines collected amounted to 3.9 g. representing an attrition rate based on a 24-hour period of 1.73%.

The run was continued under the same conditions over a similar period of time so that total reaction time was 10.8 hours. At the end of this time, conversion of HCl was 92% and the attrition rate was 1.92%.

Example 2

The experiment of Example 1 was repeated with about 3% by weight of iron added as iron oxide to the catalyst (42.5 g. Fe$_2$O$_3$). Conversion of HCl and attrition rate determined as in Example 1 by gravimetric measurement of the catalyst fines collected on the filter for the reaction period indicated are tabulated below.

TABLE I

| Reaction time (hours) | Conversion of HCl (percent) | Attrition rate (percent/24 hours) |
|---|---|---|
| 6.5 | 93.6 | 5.1 |
| 12.8 | 93.3 | 12.2 |
| 18.8 | 93.9 | 23.0 |
| 24.5 | 88.5 | 43.9 |

It will be seen from these two examples that while the prior art catalyst gives excellent conversion of HCl, it is highly sensitive to iron contamination. In the presence of iron it becomes unstable, the conversion of HCl begins to drop off with time, and the attrition rate increases rapidly.

Example 3

Another 1000 g. batch of cupric chloride-on-alumina catalyst was prepared as in Example 1. The catalyst was then heated at 450° C. for about six hours while it was purged with nitrogen. The treated catalyst was then used for oxidatively chlorinating ethylene to 1,2-dichloroethane using the same method and conditions described in Example 1 except that the temperature was maintained at about 240° C. Conversion of HCl over a reaction period of 2.5 hours was about 99%.

Example 4

About 3% by weight of iron as iron oxide (37.0 g.) was added to 863.2 g. of the heat-treated catalyst of Example 3 and the resulting mixture was used as a catalyst for the oxidative chlorination of ethylene as described in the previous examples. Over a reaction period of about 26 hours, conversion of HCl averaged about 94%. Attrition rates determined after about 20 and 26 hours of operations were 14.8% and 13.9%, respectively.

Example 5

A batch of supported cupric chloride catalyst was prepared as follows: Finely divided anhydrous cupric chloride (140 g.) was thoroughly mixed at room temperature on a dry basis with 925 g. of activated alumina (48–100 mesh) containing about 7.3% water. The mixture containing about 6.5% copper was heated in the glass reactor described in Example 1 to a temperature of 475° C. while it was purged with nitrogen at a flow rate of 6.36 cubic feet per hour for a period of about 21.5 hours.

At the end of the heat-treating period, the catalyst was used to oxidatively chlorinate ethylene to 1,2-dichloroethane in the manner described in Example 1 using the same reaction conditions except that the temperature employed in this instance was 230° C. During the 22-hour run, conversion of HCl ranged from 92 to 97% and at the end of the run loss of the catalyst from attrition was estimated to be less than 1%.

Example 6

About 3% by weight of iron as iron oxide was added to the catalyst of Example 5 and the oxidative chlorination reaction for producing dichloroethane from ethylene was conducted over the modified catalyst for an extended period of time using the same reactor and reaction conditions described in Example 5. Conversion of HCl during the reaction period was about 97–98%. Attrition rate of the catalyst is given below for the indicated reaction periods.

TABLE II

| Reaction time (hours): | Attrition rate (percent 24 hours) |
|---|---|
| 23.3 | 1.1 |
| 30.6 | 1.23 |
| 101.8 | 0.90 |
| 126.1 | 0.46 |
| 173.6 | 0.56 |
| 199.1 | 0.35 |

Example 7

Another batch of supported cupric chloride catalyst was prepared as in Example 5 but using a different sample of commercially available activated alumina containing 7.0% water. About 715 g. of the alumina was mixed at room temperature with 108 g. of finely divided anhydrous cupric chloride. The mixture was charged to the reactor of Example 1 and heated at 400° C. for eight hours with nitrogen being used to purge the mixture throughout the heating step.

At the end of the heat-treating step, ethylene, hydrogen chloride and air were reacted over the catalyst under the conditions recited in Example 5 to produce 1,2-dichloroethane. Over a reaction period of about 25.5 hours, conversion of HCl was about 95% and the attrition rate of the catalyst was about 1.71%.

Example 8

After the run of Example 7 was completed, 3% iron as iron oxide was added to the catalyst used in that example and the resulting catalyst was employed in converting ethylene to 1,2-dichloroethane by reaction with HCl and oxygen under the same reaction conditions as those in Example 5 above. Conversion of HCl throughout the reaction period averaged about 96%. Attrition rate of the catalyst is given in Table III below for the indicated reaction period.

TABLE III

| Reaction time (hours): | Attrition rate (percent/24 hours) |
|---|---|
| 28.5 | 2.11 |
| 33.5 | 1.44 |
| 52.5 | 0.91 |

Comparison of the attrition rates of the catalysts of Examples 4, 6 and 8 with the conventional catalyst of Example 1 in the presence of iron shows the clear superiority of the present method of preparation which comprises heat treatment of the catalyst constituents under specified conditions prior to use. Examples 5–8, inclusive, demonstrate also that no loss in activity over extended operation such as that occurring in Example 2 is experienced with the catalysts prepared according to the present invention.

Examples 9 and 10 below show that alumina having a water content outside that specified for the catalyst support can be easily pre-treated as disclosed above to render it suitable for use in preparing a cupric halide catalyst according to the method of the invention.

Example 9

Approximately 1040 g. of activated alumina containing about 15% water was charged to the reactor of Example 1 and purged with air at 400° C. for four hours. Then 138 g. of finely divided anhydrous cupric chloride was added to the top of the alumina bed and mixing of the salt and alumina was effected by passing nitrogen at room temperature through the bed. The mixture was then heated at 400° C. for six hours. The catalyst formed (1012 g.) contained about 6.5% copper. This catalyst was treated for its activity in the production of 1,2-dichloroethane by oxidative chlorination of ethylene in the reactor in which it was prepared using the reaction conditions described in Example 1. HCl conversions over a period of about 40 hours ranged from 94.3 to 96.3%. The attrition rate over this reaction period was 2.23%.

Example 10

The experiment of Example 9 was repeated using 1020 g. of activated alumina and 138 g. of finely divided anhydrous cupric chloride in the preparation of the catalyst. The alumina was pretreated by heating at 400° C. while purged with air for a period of six hours in this instance. The alumina and cupric chloride were mixed in the reactor at a temperature of 400° C. while purging with nitrogen. Thereafter, the mixture was heated at 400° C. for about five hours. A short preliminary run (about five hours) feeding ethylene, HCl and oxygen under the conditions recited in Example 1 was made to test the activity of the catalyst containing 6.5% copper. HCl conversion in this run was 99%. Then, 3% by weight of iron as iron oxide was added to the catalyst and the oxidative chlorination of ethylene to 1,2-dichloroethane was again conducted in the presence of the fluidized catalyst over a period of about 104 hours. HCl conversions during this reaction period varied from 92 to 96% and the attrition rate of the catalyst was only 2.41%.

Although the invention has been described with reference to a specific cupric chloride catalyst, it is not to be considered as restricted thereto. The method of catalyst preparation is equally applicable in cases where the active ingredient of the catalyst is a cupric halide other than cupric chloride, for example, cupric bromide or cupric fluoride, although such catalysts are generally somewhat less effective. Also, the catalysts may contain various amounts of the copper halide. Generally, the amount employed is that sufficient to provide from about 3 to about 12% by weight of copper in the catalyst composition. Composite catalysts containing varying amounts of a cupric halide together with other metal chlorides such as those of tin, cadmium, antimony, the alkali metal and alkaline earth metals, and the like deposited on alumina may be prepared by the method described and will be characterized by the same improvements in operation over those presently known to the art.

Likewise, the conditions under which the oxidative chlorination reaction utilizing the cupric halides as prepared by the method of the invention is conducted may be varied considerably from those exemplified without departing from the scope of the invention. In addition to ethylene, for example, a number of other unsaturated organic compounds may be chlorinated, e.g., propylene, butene-1, butene-2, pentene-1, pentene-2, 3-methyl-butene-1, 1-methyl-butene-2, 2-methyl-butene-3, hexene-1, hexene-2, 4-methyl-pentene-1,3, 3-dimethyl-butene-1, 4-methyl-pentene-2, octene-1, cyclopentene, cyclohexene, 3-methyl cyclohexene, butadiene-1,3, pentadiene-1,3, pentadiene-1,4, hexadiene-1,4, hexadiene-1,3, acetylene, propyne, butyne-1, pentyne-2, hexyne-1, etc., and their homologs and analogs. Halogenated unsaturated organic compounds containing one or more halogen atoms and one or more olefinic and/or acetylenic linkages may also be chlorinated using the catalysts of the invention. Among such may be mentioned, for example, vinyl halides, allyl halides, 2-halo-propylene, crotyl halides, 2-halo-butene-1, methallyl halides, 2-halo-butene-2, monohalogenated acetylenes, 1,1-dihaloethylene, 3-halo-pentene-1,3-halo-cyclopentene and 3-halo-cyclohexene, 3-halo-pentadiene-1,4 and the like, their homologs and analogs.

Saturated hydrocarbons such as methane, ethane, propane, n-butane, isobutane, and the like may also be chlorinated by using the oxidative chlorination technique with the catalysts as prepared herein. Higher temperatures generally are required for these hydrocarbons than for the corresponding unsaturated materials. The hydrocarbons and other compounds mentioned may be treated individually or as mixtures with each other. When mixtures of saturated and unsaturated hydrocarbons are employed, it is also possible to selectively halogenate the one or the other by proper control of reaction conditions. The hydrogen chloride, oxygen, oxygen-cntaining gas or air, and organic compound to be chlorinated may be charged to the bottom of the reactor containing the catalyst in a finely divided state. The reactant gases then serve to fluidize the catalyst. The three reactants may be introduced into the reactor in separate streams or the air or oxygen may be introduced into the mixture of the hydrocarbon and hydrogen chloride. Because of the explosive limits of the various hydrocarbons, care should be taken not to allow a mixture of hydrocarbon and oxygen to reach reaction temperature in the absence of the hydrogen chloride. The use of a fluidized bed is preferred over the fixed bed, although the latter may be employed if desired. The minimum gas velocity required for fluidizing is low. Linear gas velocities of the order of 0.1 to 0.5 foot per second are generally satisfactory and avoid excessive carry-over of catalyst fines. A certain depth of catalyst in the reactor bed is necessary and this should be such as to permit a satisfactory fluidized condition of the catalyst to be achieved and to provide sufficient contact time for substantial conversion to the desired product at the temperature used. A superficial contact time of 0.5 to 10 seconds or more is sufficient under the usual operating conditions.

The relative proportions of hydrocarbon or halogenated organic compound, hydrogen chloride, and oxygen, air, or oxygen-bearing gas may be readily calculated. For the conversion of ethylene to dichloroethane, for example, reactant ratios are based on the following equation:

$$2HCl + C_2H_4 + \tfrac{1}{2}O_2 \rightarrow C_2H_4Cl_2 + H_2O$$

The theoretical amount of oxygen required is thus 0.5 mole per two moles of hydrogen chloride. Stoichiometric quantities of the reactants for the particular reaction can be employed but the equilibrium in the oxidation reaction may be shifted by employing excesses of one or other of the reactants. In the production of a saturated chlorinated compound from an unsaturated hydrocarbon, for example, a very slight excess of oxygen is preferred with the stoichiometric quantities of hydrocarbon to hydrogen chloride to oxygen being 1:2:0.55. When air is used instead of oxygen, the preferred ratio of hydrocarbon: hydrogen chloride:air becomes 1:2:2.75. Other ratios may be employed, however, depending upon the particular catalyst employed and the product desired.

Generally, temperatures in the range from about 180° to about 450° C. may be employed with the catalysts prepared according to the method of the invention. The particular preferential temperature within this permissible broad range will vary to some extent with the nature of the catalyst and the hydrocarbon reactant employed. In the oxidative chlorination of ethylene with a copper chloride-on-alumina catalyst prepared according to the invention, conversions of HCl approaching 100% can be obtained with a temperature in the reaction zone as low as 220° C. When other salts are employed with the copper chloride, the operable temperature range is usually higher but here again the improved catalyst of the invention gives increased conversion at lower temperatures and significantly lower attrition rates.

The invention is not limited to the execution of the hydrogen chloride oxidation reaction in the presence of an organic chlorine acceptor but may be applied as well in oxidation of hydrogen chloride when no acceptor is present, i.e., in the so-called Deacon reaction.

What is claimed is:

1. Improved catalytic compositions containing cupric chloride as the active catalytic agent in combination with activated alumina prepared by mixing in the dry state anhydrous cupric chloride with activated alumina having a loss on ignition at 1,000° C. of from 3 to 8% and heating said mixture at a temperature of at least 350° C. for a period of at least 3 hours.

References Cited
UNITED STATES PATENTS

| 2,399,488 | 4/1946 | Hearne | 252—441 |
| 2,442,285 | 5/1948 | Cheney | 252—441 |
| 2,547,928 | 4/1951 | Davis et al. | 252—441 |
| 3,010,913 | 11/1961 | Price | 252—441 |
| 3,148,222 | 9/1964 | Penner et al. | 252—442 |
| 3,232,889 | 2/1966 | Bellis | 252—441 |
| 3,353,916 | 11/1967 | Lester | 252—441 |

PATRICK P. GARVIN, Primary Examiner

U.S. Cl. X.R.

23—219; 252—442; 260—658, 659, 663

PO-1050
(5/69)

UNITED STATES PATENT OFFICE
CERTIFICATE OF CORRECTION

Patent No. 3,461,084                  Dated   August 12, 1969

Inventor(s)   Tao P. Li

It is certified that error appears in the above-identified patent and that said Letters Patent are hereby corrected as shown below:

In Column 5, line 53, the word "treated" should read --tested--.

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents